Jan. 3, 1950 W. H. MEAD Re. 23,186
SURFACE TREATING METHOD AND APPARATUS
Original Filed Aug. 2, 1945
Fig. 1.
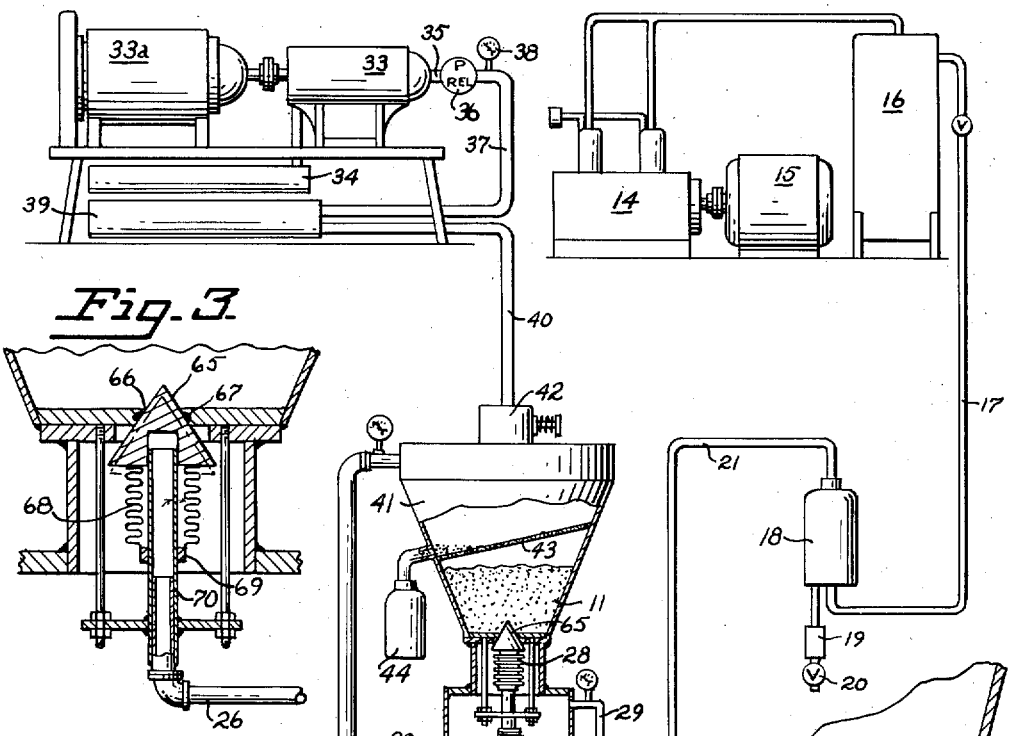
Fig. 3.
Fig. 4.
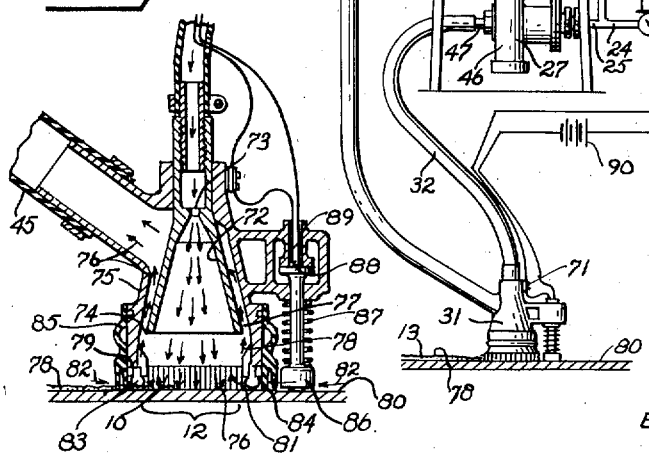
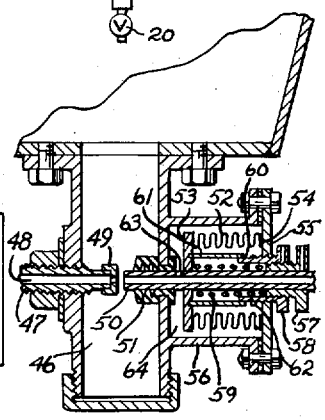
Fig. 2.
INVENTOR
WILLIAM H. MEAD
BY A. Durham Owen
ATTORNEY.

Reissued Jan. 3, 1950

Re. 23,186

UNITED STATES PATENT OFFICE 23,186

SURFACE TREATING METHOD AND APPARATUS

William H. Mead, Oakland, Calif.

Original No. 2,455,514, dated December 7, 1948, Serial No. 608,386, August 2, 1945. Application for reissue October 3, 1949, Serial No. 119,291

12 Claims. (Cl. 51—8)

Matter enclosed in heavy brackets [ ] appears in the original patent but forms no part of this reissue specification; matter printed in italics indicates the additions made by reissue

This invention relates to a novel method and apparatus for cleaning or treating surfaces.

Broadly stated, the invention has to do with the art of cleaning or treating surfaces in which a material or substance is impinged against or deposited on said surface.

The invention among other things accomplishes results which could not be obtained practically before, and permits the use of abrading materials which could not be used economically before.

A long-standing problem in the use of force applied to a surface-treating material, such as an abrasive, to direct it against a surface, has been the lack of control over the spent material after it has hit the surface, and over any surplus material, as well as lack of control over any particles loosened from the surface by the abrading action. Each kind of treating material has effects peculiar to itself, but one common problem has been lack of control. The present invention not only solves this problem of control, but in doing this it solves many other long-standing related problems by making possible the recovery of the treating material so it can be re-used, as well as removal from the surface of any loosened particles; and it increases many fold the usefulness and efficiency of surface treating.

All are familiar with the usual scene of sandblasting a brick building to clean off the bricks. There is sand strewn all over the neighborhood, with damage to painted surfaces of adjacent buildings and automobiles parked nearby.

The abrasive was directed against the brick surface, and, after contact, was deflected off the work into the surrounding area, while the dust, mortar, and clay particles, removed by the abrasive have also been blown all over the area. To avoid silicosis and breathing this dust and grit-laden air, the operator had to wear a mask. With the present method he wears no mask. To avoid physical cutting by the deflected abrasive the operator had to wear heavy, cumbersome, abrasion-resisting clothing. With the present method he could wear patent-leather shoes and a suit of the most delicate fabric without injury to either. Until the present invention there was also no practical way to shield delicate surfaces, machinery, bearings, windows, etc., against injury by the flying grit. As a result the operation of cleaning by sandblasting was limited to work which could be carried on either in a specially fitted room, or in the case of small work, in a small box with an observation window which needed replacement often, or in the case of a ship, to the underwater outer skin.

The injury to machinery was one of the reasons why the use of sand-blasting heretofore was forbidden on ships sides above the plimsoll mark for on decks, or inside the ship; and it has relegated the cleaning of the bulk of the steel plates on shipboard to the inefficient, old-fashioned chipping or metal brushing methods. With the present invention no shielding of adjacent parts is necessary, no matter how delicate they may be.

The outstanding advantage of the present invention is the fact that it does permit of thorough cleaning of the element being treated, such as a ship deck and other parts throughout the inside of the ship. This thorough cleaning is something that was not possible with the wire brushing and chipping methods heretofore used, as these unavoidably left some rust. Treatment by the present method materially lengthens the life of the whole ship, because a new protective coating may be applied to a perfectly cleaned surface before oxidation can set in. There is no rust left below the paint to hasten the corrosion.

Why the present invention is able to be used throughout the ship, in the presence of unshielded delicate machinery, is the fact that it controls the abrasive throughout the whole operation, together with the recovery of the loosened debris.

The above is just one example of hundreds of applications to be made and advantages resulting from this invention. The reason for its success is that it permits sand or grit blasting in places where it could not be used before because there has heretofore been no practical apparatus or method for controlling the abrading material, and shielding of the delicate parts was impracticable.

The method, as stated, has application to many uses, such as cleaning metal surfaces of any shape, with nozzles shaped to conform to the surface, which have become rusted and oxidized, or which are covered with paint or tar coatings; cleaning wood floors, wood work, plaster walls, concrete, etc.; frosting glass or giving various finishes to other materials; metal spraying and coating surfaces; re-surfacing; metal peening (a method for increasing the density of metals by impinging shot against its surface); etc. The above are only a few of the uses to which this method may be put.

It is therefore an object of the invention to provide a method and apparatus in impingement treating for controlling the work area as well as the spent or excess treating agent together with the removed debris.

Another object is to provide a method of abrasion treatment in which the working area is portable and moves around over the work, without permitting any substantial amount of the abrasive material or removed debris to escape from the working area.

Another object of the invention is to increase the efficiency of surface-treating by impingement of a substance by the step of cleaning away the spent material and the loosened debris as soon as it has impinged against the surface, thereby removing it from the path of the next approaching impinging particles. This exposes a larger effective surface area, and cuts down the wear of the impinging material produced by impingement upon accumulated spent material lying unremoved upon the surface.

Another object of the invention is to provide a method and apparatus for carrying on impinging abrasion treatments in a way that neither the operator, nor the apparatus, nor nearby delicate objects need be specially covered or protected against either the flying abrasive or any of the dislodged surface scale or debris.

Another object of the invention is to provide a method which eliminates the expensive protective equipment heretofore necessary in carrying on treating operations with impinging substances in loose form.

Another object of the invention is to provide a method for preventing lateral spreading of the impinging substance.

Another object of the invention is to make possible recovery and re-use of the treating material thereby making economical and practical the use of expensive treating agents having especially desirable qualities.

Another object of the invention is the provision of apparatus whereby remote control is had of the impinging material and it is controlled in relation to the air blast in such a way as not to stop up the conduits but always to keep them open and free of any accumulation of material.

The above and other objects accomplished by this method and apparatus will become obvious from the following description of a preferred apparatus capable of carrying out the method applied to abrasion treatment.

In the drawings Fig. 1 is a diagrammatic representation, partly in cross-section, of a complete apparatus;

Fig. 2 is an enlarged detail cross-sectional view of the control valve for the pressure medium and the abrasive;

Fig. 3 is a similar view of the control valve for automatically admitting recovered abrasive into the main feed hopper; and Fig. 4 is a similar view of the treating head.

As stated heretofore, the present method has application to many uses, with many materials and by many different forms of apparatus, although the one described is an efficient one.

In the drawings the numeral 10 designates the surface being treated by a surface-treating material 11, in a treating zone 12. This surface may be of wood, glass, metal, or synthetic and may be covered with paint, rust, or other material 13 which it is desired to remove. The surface-treating material 11 may be an abrasive or a covering material depending upon the treatment it is desired to give the surface 10. For purposes of illustration an abrasive treatment will be dealt with, and this is not intended to mean any relinquishment of the scope of interpretation of the invention.

The illustrative apparatus shown in Fig. 1 employs a conventional air compressor 14, driven by an electric motor 15 to store air in tank 16. Compressed air is piped through conduit 17 from the tank to an aridifier 18 which separates the moisture in the air stream and lets it drain into the trap 19 from which it can be emptied through the valve 20.

From the aridifier the air passes through the conduit 21 in which is a hand shut-off valve 22 and an electrically controlled valve 23. The valve 22 is to shut off the air pressure if the valve 23 ever needs to be removed for repairs. The air then passes through the conduit 24 into the branch conduits 25 and 26. The branch 25 conducts the air into the treating-material control valve 27 (detailed in Fig. 2) and the conduit 26 conducts the air into the abrasive recovery hopper valve 28 (detailed in Fig. 3), and through the conduit 29 the air is conducted into the top of the treating-material feed hopper 30 so as to maintain a pressure on the top of the treating material 11 therein. From the valve 27 the air passes to the operating head 31 through the conduit 32. This completes the compressed air circuit.

The suction circuit comprises a pump 33 which may be the type run by a motor 33A. Any other form of suction-creating device may be used, as the invention is not limited to any particular way of creating the reduced pressure for use in the operating head 31. A muffler 34 is connected to the outlet end of the blower to muffle the noise. A conduit 35 is connected to the inlet end of the blower and has a pressure relief valve 36 to keep the pressure in the conduit 37 at a predetermined maximum. The gauge 38 shows what the pressure is. A dust collector 39 is connected to the conduit 37 and filters out the dust entering through the conduit 40.

Next comes a separator 41, illustrated here as being of the cyclone type. By use of a separator the treating material 11 may be re-used several times, thereby permitting the economical use of relatively expensive treating materials. Another pressure relief valve 42 may be installed on the outlet end of the separator, especially where the equipment is made of a size to power more than one operating head 31 at the same time. Thus when fewer than all the heads are operating at the same time the relief or regulating valve 42 will make compensation and establish the pressures needed for successful operation of the heads in use.

A flexible conduit 45 connects each movable operating head 31 to the separator 41.

The dust will pass into the dust collector 39 from the separator 41, but the heavier and larger particles of debris picked up by the operating head 31 will settle out of the air stream and will fall onto the screen 43. This screen is of a mesh adapted to pass the treating material 11. Larger particles will be guided across the screen and into the removable receptacle 44. The treating material 11 is accumulated in the bottom of the separator hopper 41.

Next I shall explain the operation of the valves 27 and 28.

An important feature of novelty in the operation of this illustrative apparatus is the treating-material control valve 27 by means of which any clogging of the line by the treating material 11 is prevented. See Fig. 2. The valve 27 is positioned in the bottom of the treating-material feed hopper 30 so that the treating material 11 will flow down into and fill the casing 46. For purposes of clarity the cut-away view in Fig. 2 omits showing this material. In one side of the casing 46 is positioned the fitting 47 having a hole 48 opening at its inside end into the casing 46 and at its outside end into the conduit 32. A resilient perforated gasket 49 may be secured to the inner end. On the opposite wall of the casing 46 a sliding fitting 50 is mounted in a gasket 51 to provide a leak-tight fit. Means to actuate the sliding fitting 50 include the bellows 52 having its end wall 53 rigidly secured to the fitting 50. The other end 54 is secured to the plate 55 mounted on the housing extension 56 with a leak-tight fit. Two relatively adjustable sleeves 57 and 58 are adjustably secured in the plate 55. The sleeve 57 is threaded inside the sleeve 58 and adjusts the tension on the spring 59. The sleeve 58 has a reduced end 60 in slidable engagement with a sleeve 61 on the bellows end wall 53. The extent of movement of the bellows, and therefore of the sliding fitting 50, is regulated by contact of the end of the sleeve 61 on the shoulder 62. A bleed hole 63 connects the sealed chamber 64 with the bore of the fitting 50 for all positions of the fitting 50. Normally the end of the fitting 50 is in engagement with the gasket 49 and the fitting 47 so that there is an open connection between the bores but none into the casing 46. The parts move into the position shown in Fig. 2 when the device is in operation. The spring 59 is preferably adjusted to hold the fitting 50 against the gasket 49 until a pressure of about 80 pounds per square inch is built up in the chamber 64 through the bleed hole 63 to move the bellows 52 and its connected fitting 50 into the position shown in Fig. 2. This means that the first air passing through the valve 27 will be used to clear out the fitting 47 and the conduit 32 before any treating material 11 is introduced from the casing 46 through the opening in the gasket 49. One great advantage of this arrangement is that the operator may be many feet away from the valve 27 and a second operator is not required to move the fitting 50, because it is moved automatically by the bellows 52 to expose the hole 48 in the gasket 49 after the line 32 is cleaned out and it is moved automatically by the spring 59 to close off the hole 48 from the casing 46 while the air current is still flowing sufficiently to clean out the line 32.

Another automatic control is effected by the treating-material recovery valve 28 shown in detail in Fig. 3. In operation it is desirable to close the hopper 30 whenever material 11 is being fed from it to the operating head 31. When this operation ceases it is desirable to have any reclaimed treating material 11 in the separator 41 flow into the hopper 30. To effect this result a valve plug 65 is fitted to an opening 66 in the separator 41. Preferably the opening 66 has a suitable gasket 67. The plug 65 may be made heavy enough to open by gravity since it slides freely on the support 70. It is held closed by air pressure through the branch line 26 and the bellows 68 rigidly secured at 69 to the air pipe and support 70. The action of the plug 65 is to close as soon as air comes into the line 26. This seals the feed hopper 30 so that the air pressure applied to it through the pipe 29 will assist the force of gravity in feeding the treating material into the casing 46. As soon as the air pressure is turned off the plug 65 drops, from its own weight plus the weight of the treating material above it, and refills the hopper 30. In this way an automatic refilling is effected without the operator having to do anything at the valve 28. It makes the device foolproof and saves extra labor. While my preferred machine includes recovery and re-use of the spent material, that feature is not essential.

To further facilitate the remote and automatic control of the whole device, a solenoid or electrically actuated valve 23 is arranged for control from a switch 71 on the operating head.

In the apparatus used for illustration the operating head 31 has an inner casing or shell 72 which serves to direct onto the surface 10 the treating material 11 issuing from the jet 73. The mouth 74 of the casing 72 confines the work area 10 to the treating zone 12. A second or outer casing 75 should surround the inner casing 72 adjacent the mouth 74 on the latter. How far up the outside of the casing 72 the outer casing extends is a matter of choice, the criterion being a size and shape that will give a sustained velocity to the air flow indicated by the arrows 76 so they will have a high weight-sustaining or carrying characteristic. This characteristic is affected by the volumetric cross section of the passageway 77. The velocity found best is 400 to 600 feet per second. The shell 72 comes down fairly close to the work surface so that the impingement zone is regulated and confined around the outer rim of the working zone 12.

Through this passageway 77 a vacuum or reduced pressure is maintained over the treating zone 12 and in the controlled area 10 defined within the inner casing 72 and the outer casing 75. This reduced pressure maintained in the controlled area serves to increase the velocity of the treating material 11 as it passes down the shell 72 from the jet 73. Its other and primary function is to remove any spent treating particles 11 after they have impinged on the confined surface 10. In a cleaning operation, the induced air flow also serves to remove any debris 78 loosened from the work 80 by the treating material 11.

To facilitate and supplement the movement of air for carrying away the spent material 76 and any loosened debris 78, and to reduce to a minimum any deflection of the treating material 11 under the rim 79, the rim 79 is preferably spaced slightly above the work surface 80. This provides an air gap 81 through which an air flow indicated by the arrows 82 is induced. The rim 79 is spaced from the work surface 80 by the adjustable feet 83. This air flow helps to sweep the border of the confined treating zone 12 and helps to carry into the passageway 77 any spent material 76 and removed debris 78. A brush or other porous, easily flexed, maze-like baffle member 84 is mounted adjacent the rim 79 and bears on the work surface 80 to form an air pervious impediment between the rim 79 and the work. In certain cases an additional flexible boot 85 is used to support the baffle member 84 which may be a brush or other material having a porous lower edge. This boot mounting is particularly useful where the work surface 80 is uneven. In the drawing the brush 84 is made with rubber bristles, although a brush of any material will work, so long as it provides (1) a porous barrier to let an air stream 82 flow through it and under the rim 79, and (2) a deflecting or impediment member against which any stray treating material or removed debris will strike and be stopped and then be picked up by the inrushing air stream.

It is important to provide two impinging air currents. One current is the blast of air carrying the treating material 11 through the jet 73 and into contact with the work area 10. This is shown by the arrows coming down from the jet 73. The other current is the vacuum-induced flow causing an air sweep under the rim 79 of the head 31 and over the surface 10 through the maze 84. This is shown by the arrows 82. These two currents meet and impinge just inside the maze and form a pick-up force which removes the spent treating material and the debris in the direction of the arrows 76 and out through the conduit 45. The maze 84 lends its part in making possible this impingement so near the rim 79 without any substantial amount of the treating material being lost through the maze. The effect is for the maze 84 to present a physical barrier around the border of the treating zone 12 to that part of the treating material which is tending to be blown or deflected outwardly under the rim 79 while permitting substantial volumes of air to pass through from the outside into the working zone 12 to accomplish the impingement.

The net result of the above is the direction of a surface-treating agent against a surface confined within a protective chamber spaced above the surface over which a reduced pressure is maintained and in which an immediate and complete scavening of the spent agent is effected. Thus each particle of treating material 11 retains its initial velocity and path so it can expend all its kinetic energy in actual work on the work area 10. An equally important result, and the one which has given the method and device such impetus is that the operation can be carried on without any substantial amount of the treating agent 11 getting outside the treating zone, where it might injure delicate machines and surfaces.

The operating head 31 may be of any size required for the particular treating material and surface being worked on. It is movable, except in those rare cases where it is easier to move the work 80 relative to the head 31. The pipes 32 and 45 are flexible conduit of any suitable form and the head 31 is preferably mounted on adjustable skids 83 which will position it correctly over the work 80.

Regardless of size, the operating head should provide means for confining or substantially closing off an area 10 of the surface 80 being treated. Also it should provide means for establishing a vacuum or reduced pressure in said confined area and of producing a flow of air, adjacent the surface 10 being treated, of sufficient volume and velocity to carry off and away from the surface 10 the spent or loose treating material 76 and loosened debris 78 within the operating head.

This will carry out applicant's method for treating a surface with a loose material which includes the steps of directing a flow of treating material through a jet and a housing at a confined area on the surface being treated, establishing a reduced pressure in said housing, admitting a flow of air into said housing around its rim adjacent said surface, while providing a physical barrier to the treating material between said rim and said surface, and exhausting said material from said housing after it has contacted said surface.

In use, the operating head 31 must keep its maze-like member 84 in contact with the work surface 80 or the conditions needed to obtain the impinging effect will be lost and the treating material 11 will be scattered outside the working zone 12. To protect against this accidental scattering of the material, an automatic stop is provided on the head 31 so that the valve 23 is closed and the air blast is stopped if the head 31 and the member 84 are lifted away from proper position on the work 80. This safety stop may be of any form of circuit breaker which on contact with the work 80 closes a circuit breaker in the control circuit and keeps it closed so long as contact with the work is maintained. The one illustrated includes the spring pressed plunger 86 with the spring 87, mounted to depend from the housing 31. Its top end is insulated and engages the contact point 88 to close it against the other contact point 89. A battery 90 or other source of current is sufficient to energize the solenoid valve 23, whenever the operator closes the hand switch 71.

The operation cycle of the apparatus disclosed is as follows:

A charge of treating material is contained in the storage chamber 30. The operating head 31 is in place on the work 80, and the compressor motor 15 is in operation so that there is a charge of air stored in the tank 16. The vacuum pump 33 is in operation so that a zone of reduced pressure exists under the operating head 31 and there is a flow of air 82 into it through the maze 84. The operator presses the button 71 and opens the valve 23 which admits air pressure on top of the treating material 11 in the chamber 30 and also forces a jet of air through the sliding fitting 50, the opposite fitting 47 and out the jet 73. It also closes the valve 65 in the recovery hopper 41. When the pressure by-passed into the housing 56 through the port 63 reaches about 80 pounds, the sliding fitting 50 will move to the right and some treating material 11 will be picked up in the air stream and carried into the fitting 47 and out through the jet 73 in the operating head 31. The treating material 11 in the operating head 31 is showered downwardly onto the confined work area 10 in the treating zone 12, where it effects a loosening of whatever debris 78 may be coating the work 80. As the treating material 11 impinges on the work in the confined area this material 11 immediately comes under the influence of the air stream 82 flowing inwardly through the impediment 84 under the edge of the rim 79, with the result that these forces or streams impinge and the surface 10 being treated is cleaned of the spent material 11, and the spent material (see arrows 76) and the loosened debris (see arrows 78) are conveyed away out of the operating head 31 through the flexible conduit 45 and into the separator 41. The operating head 31 is moved over the working surface 80. In the drawings it has already moved over the surface lying to the right of the treating zone 12 and is being moved to the left to clear that surface of the debris 78.

When the loosened debris 78 and the treating material 11 are returned to the separator 41, they are there separated and the debris is deposited in a tank 44 while the reclaimed treating material 11 is deposited in the hopper 41 from whence it flows at intervals through the valve 28 into the feed hopper 30. When the treating material in the hopper 30 is nearing exhaustion the operator releases the switch 71. This closes the valve 27 and allows the plunger 65 in the valve 28 to open, thereby refilling the hopper 30. Note the dotted line position in Fig. 3. When the material has been transferred into the hopper 30 the switch 71 is closed and the valve 28 closes. Then as soon as the air has blown out the lines 47 and 32, and the pressure in the housing 56 reaches the predetermined point, the valve 50 opens. This reclaiming apparatus is subsidiary and is not an absolute essential of the invention, as the spent material 76 may be thrown away after one passage through the jet 73.

Also the invention is not limited to this one way of imparting movement to the treating material.

For example, one step in this method includes directing a treating material against the surface area 10 being treated. This directing can be accomplished in many ways. For example, a blast of air may pick up the treating material and cause it to contact the surface with whatever force is necessary to accomplish the treating effect desired. On rust-encrusted metals this force would be greater than when treating a soft wood. Other conventional means such as an impeller or even gravity may be used to impart movement to the treating material. The present invention is not limited as to how this movement is obtained.

Another step in this method includes maintaining a vacuum or zone of relatively reduced pressure over the area 10 being treated as well as a zone of reduced pressure in the housing 72 through which the abrasive is travelling. Any mechanism for producing this reduction of pressure may be used. For example, a vacuum produced by an ejector using air, steam or water may be used. Or it could be a pump or blower. It is important to provide a vacuum in the treating zone 12 sufficiently strong to develop the air stream 82 flowing in through the barrier 84 under the rim 79 which after impinging with the treating material is strong enough to sweep it up and out of the way of oncoming unspent treating material. Other advantages of treating in the presence of a vacuum are discussed elsewhere in this description.

Because the method has been described in connection with what is known in industry as sandblasting, the apparatus included a separator 41 connected to a sand storage chamber 30 to permit substantially continuous operation and reclaiming of the abrasive treating material 11. While such operation is most desirable, it is not essential to the method and the treating material may be discarded after the spent part is withdrawn from the treating zone 12.

The shape of the mouth 74 on the operating head 31 may be circular, crescent, oval or rectangular or any other shape desired. Where a rectangular or crescent shape is used, the inner casing 72, through which the treating material is introduced, may be bounded around only part of its opening by the outer casing 75, through which the treating material is removed by the air current. For example, an operating head 31 may be made with the mouth 74 of the casing 72 long and narrow like the shape of a paint brush in cross-section. In this case the mouth of the casing 75 may lie along only one side of the mouth 74. A suitable brush 84 will surround the outside portions of both mouths, leaving a free passage under the partition separating them. In this case the treating material will be impelled down the casing 72 onto the work and the up-flowing stream in the casing 75 will pull the treating material and loosened debris 78 under the partition and up the casing 75. This kind of an operating head can be moved over the work like a paint brush at whatever angle is most efficient.

"Treating substance" may be defined as any loose or flowing substance useful in treating a surface either by contact with the surface or by deposit thereon. All such materials have the common characteristics of spreading dust, spray, or the material itself over adjacent areas. Examples are surface-coating materials and abrasives.

From the foregoing it will be seen that this method and apparatus make possible the use of a small, light-weight operating head, which can be used on shipboard, in closed rooms, or around delicate machinery with complete safety because there is no escape of the treating material from under the treating head. The area of treatment is controlled. In the case of metal, or spraying with treating materials of light weight, the need of a baffle adjacent the work is not as vital.

This application is a continuation-in-part of my earlier application, S. N. 589,805, filed April 23, 1945, and which has become abandoned.

The claims are:

1. A method of treating a surface with loose, solid abrasive material and preventing gritty material from flying about, which comprises confining said material within an impediment to said abrasive material permeable to air around its periphery, while projecting said abrasive material with a blast of air *against the surface confined within said impediment* and while maintaining the air [against the surface confined within said impediment] pressure at the inner periphery of said impediment sufficiently below that outside said impediment to induce a flow of air sufficient to pick up the solid particles which have been stopped from passing to the outside by said impediment.

2. Apparatus for treating a surface and for collecting loose material from such treatment and preventing it from flying about, which comprises a casing having an open end, impeding means projecting from such end, suction means connected to said casing, jet means projecting within the said casing past said suction means connection toward said open end and terminating short thereof, said impeding means forming a maze-like passage to impede exit of treating material and permit entrance of air, means to supply air laden with treating material to said jet, and means responsive to improper application of said apparatus to said surface to shut off said supply.

3. In a surface-treating machine the combination of a treating head adapted to provide a confined surface treating chamber, comprising an outer housing having a rim spaced away slightly above the work surface, a maze-like air-pervious impeding member filling the space between said rim and said work surface, a supply source for air under reduced pressure, means for connecting said source to said outer housing, an inner housing fitted inside said outer housing passageway and extended down near the rim of the outer housing to provide a reduced pressure air passageway between the two housings, a source of air under greater than atmospheric pressure, a jet near the upper part of said inner housing connected to said air source, and means for introducing a treating material into said air stream before it reaches said jet.

4. Apparatus for treating a surface and for collecting loose material from such treatment and preventing it from flying about, which comprises a casing having an open end spaced slightly above said surface, air-pervious deflector means secured around said end and adapted to rest on said surface to fill the space between said open end and said surface, suction means connected to said casing, jet means projecting within the said casing past said suction means connection toward said open end and terminating short thereof, said deflector means forming a maze-like passage to impede exit of treating material and permit entrance of air, and means to supply air laden with treating material to said jet.

5. In a device for treating a surface with an air-blasted, suction-removed abrasive having air compressor means for impelling said abrasive at the surface being treated and vacuum means for conveying the spent abrasive away from said surface; the combination of a treating head spaced slightly above and adapted to cover over a portion of the surface being treated, said treating head having an open end, a jet means therein with its open end pointed toward the open end of said head and with its other end connected to said abrasive impelling source, an outlet from inside said head connected to said vacuum means, and an air-pervious maze-like abrasive-deflecting means secured around the perimeter of the open end of said head and adapted to rest on said surface to fill the space between said open end and said surface, whereby abrasive particles which are thrown radially outwardly in said head will strike against said deflecting means and thereby lose outward momentum and become subject to easy movement by the air current sweeping from the outside in through said air-pervious maze-like deflecting means.

6. In a device for treating a surface with an air-blasted, suction-removed abrasive having air compressor means for impelling said abrasive at the surface being treated and vacuum means for conveying the spent abrasive away from said surface; the combination of a treating head spaced slightly above and adapted to cover over a portion of the surface being treated, said treating head having an open end, a jet means therein with its open end pointed toward the open end of said head and with its other end connected to said abrasive impelling source, an outlet from inside said head connected to said vacuum means, and an air-pervious maze-like abrasive-deflecting means secured around the perimeter of the open end of said head and adapted to rest on said surface to fill the space between said open end and said surface, said abrasive-deflecting means having tortuous air passages therein which do not align with any point within said head, whereby abrasive particles which are thrown radially outwardly in said head will strike against said deflecting means and thereby lose outward momentum and become subject to movement by the air current sweeping from the outside in through said air-pervious maze-like deflecting means.

7. In a device for treating a surface with an air-blasted, suction-removed abrasive having air compressor means for impelling said abrasive at the surface being treated and vacuum means for conveying the spent abrasive away from said surface; the combination of a treating head spaced slightly above and adapted to cover over a portion of the surface being treated, said treating head having an open end, a jet means therein with its open end pointed toward the open end of said head and with its other end connected to said abrasive impelling source, an outlet from inside said head connected to said vacuum means, and an air-pervious maze-like abrasive-deflecting means secured around the perimeter of the open end of said head and adapted to rest on said surface to fill the space between said open end and said surface, said abrasive-deflecting means having air passages formed by the spaces between two or more rows of vertically depending elements arranged in spaced apart staggered relation whereby any abrasive particle which is thrown radially outwardly in said head will bounce against one or more of said depending elements and thereby lose its outward momentum so that it will be subject to the air current sweeping from the outside in through said air-pervious maze-like deflecting means.

8. A method of treating a surface in an area confined under a head having a series of perforations adjacent its end near said surface with an air-blasted abrasive which comprises subjecting such surface to the action of an air-blasted abrasive in the presence of a vacuum-induced air current entering from the outside around the full perimeter of said head adjacent said surface, which induced air current impinges with the abrasive impelling current and lifts the spent abrasive out of the way of unspent abrasive.

9. The method of cleaning a surface in an area confined under a head by impinging abrasive particles against said surface within the confines of said head and for removing said spent particles from the path of unspent particles as distinguished from impinging abrasive particles against said surface and using the force of unspent particles to push aside spent particles, which comprises supporting said head over said surface with a narrow space between the rim of the head and said surface filled with a maze-like air-pervious deflector, then projecting said abrasive particles against said surface to be cleaned, then causing said particles to be thrown against said deflector, and then passing an air current from the outside in through said air-pervious deflector which picks up said deflected particles where this laterally entering air current impinges with the outwardly deflected abrasive impelling current and sweeps the spent abrasive off said surface and out of said head.

10. A treating head adapted to be connected to an air-blasted, suction-removed abrasive machine, comprising a hollow head member having an open end, means for supporting said open end in spaced relation to the surface against which said head is pointed, said head having a jet means therein with its open end pointed toward the open end of said head and with the other end of said means adapted to be connected to said air blast machine, said head also having an outlet from inside said hollow head adapted to be connected to said suction machine, said means for supporting said open end of said head including an air-pervious maze-like abrasive-deflecting means secured around the perimeter of the open end of said head and adapted to rest on said surface to fill the space between said open end and said surface, whereby abrasive particles which are thrown radially outwardly in said head will strike against said deflecting means and thereby lose outward momentum and become subject to easy movement by the air current sweeping from the outside in through said air-pervious maze-like deflecting means.

11. The method of treating a surface with loose, solid abrasive material and preventing the material from flying about, which comprises confining said material within an impediment to said abrasive material permeable to air around its periphery, while projecting said abrasive material against the surface confined within said impediment and while maintaining the air pressure at the inner periphery of said impediment sufficiently below that outside said impediment to induce a flow of air sufficient to pick up the solid particles which have been stopped from passing to the outside of said impediment.

12. Apparatus for treating a surface and for collecting loose material from such treatment and preventing it from flying about, which comprises a casing having an open end spaced slightly above said surface, air-pervious deflector means secured around said end and adapted to rest on said surface to fill the space between said open end and said surface, suction means connected to said casing, a passageway extending within said casing past said suction means connection toward said open end and terminating short thereof, said deflector means forming a maze-like passage to impede exit of treating material and permit entrance of air, and projecting means to propel treating material through said passageway.

WILLIAM H. MEAD.

REFERENCES CITED

The following references are of record in the file of this patent or the original patent:

UNITED STATES PATENTS

| Number | Name | Date |
|---|---|---|
| 584,021 | Tilghman | June 8, 1897 |
| 847,269 | Wise | Mar. 12, 1907 |
| 847,270 | Wise | Mar. 12, 1907 |
| 1,171,286 | Wadsworth | Feb. 8, 1916 |
| 1,585,549 | Jorgensen | May 18, 1926 |
| 1,641,342 | Mauney et al. | Sept. 6, 1926 |
| 1,752,664 | Forcier | Apr. 1, 1930 |
| 1,858,475 | Wolever | May 17, 1932 |
| 1,951,105 | Myers | May 13, 1934 |
| 2,152,352 | Holt | Mar. 28, 1939 |

FOREIGN PATENTS

| Number | Country | Date |
|---|---|---|
| 108,256 | Australia | Aug. 11, 1939 |
| 369,988 | Italy | Apr. 4, 1939 |
| 380,330 | France | Oct. 4, 1907 |